United States Patent [19]

Hasquenoph et al.

[11] 3,954,233
[45] May 4, 1976

[54] AUTOMATIC HANGING AND WEDGING DEVICE FOR AIRCRAFT LOADS

[75] Inventors: Jean H. Hasquenoph, Lagny; Pierre F. Coutin, Paris, both of France

[73] Assignee: R. Alkan & Cie, Valenton, France

[22] Filed: Mar. 13, 1975

[21] Appl. No.: 557,980

[30] Foreign Application Priority Data
Sept. 16, 1974   France .............................. 74.31180
Nov. 15, 1974   France .............................. 74.37645

[52] U.S. Cl. ......................... 244/137 R; 89/1.5 G
[51] Int. Cl.² ........................................ B64D 1/02
[58] Field of Search ................. 244/137 R, 118 R; 89/1.5 G, 1.5 R, 1.5 B, 1.5 F; 294/83 R, 83 AE, 83 AB; 248/119 R

[56] References Cited
UNITED STATES PATENTS

| | | | |
|---|---|---|---|
| 3,494,248 | 2/1970 | Wenger | 89/1.5 R |
| 3,610,094 | 10/1971 | Craigie | 89/1.5 F |
| 3,722,944 | 3/1973 | Dand | 89/1.5 R X |
| 3,784,132 | 1/1974 | Newell | 89/1.5 F X |

Primary Examiner—Trygve M. Blix
Assistant Examiner—Galen L. Barefoot
Attorney, Agent, or Firm—Ulle C. Linton

[57] ABSTRACT

This device for automatically releasably hanging and holding against lateral oscillation load carried under aircrafts has load suspension hooks and holding members preventing the lateral oscillation of the load which project very moderately from the underface of a closed casing containing the actuating mechanism. This mechanism includes in combination linkage detents and springloaded devices disposed on either side of each load suspension hook. A certain delay is introduced into the action whereby when the load is lifted for engagement with the hooks, these are actuated to their load-supporting position and release with a predetermined time-lag the linkage holding the load against lateral oscillation to their operative position. To this end, each pivotally mounted hook is connected via a spring-loaded piston-and-cylinder actuator to a rocker controlling the movement of wedge members controlling in turn a lever supporting the holding members.

11 Claims, 6 Drawing Figures

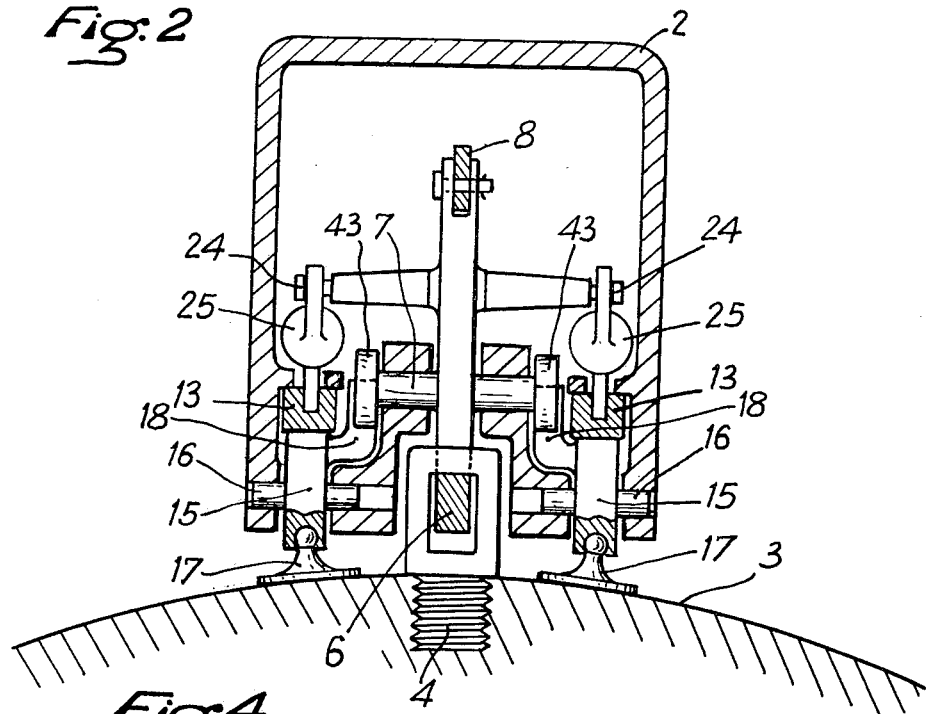
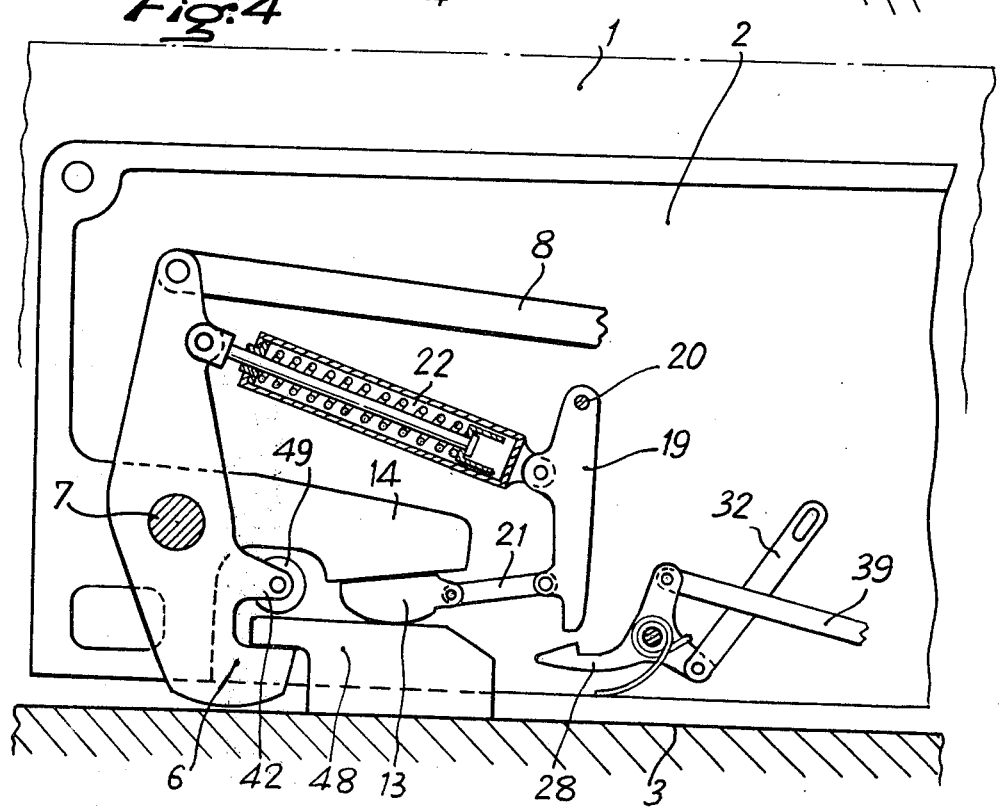

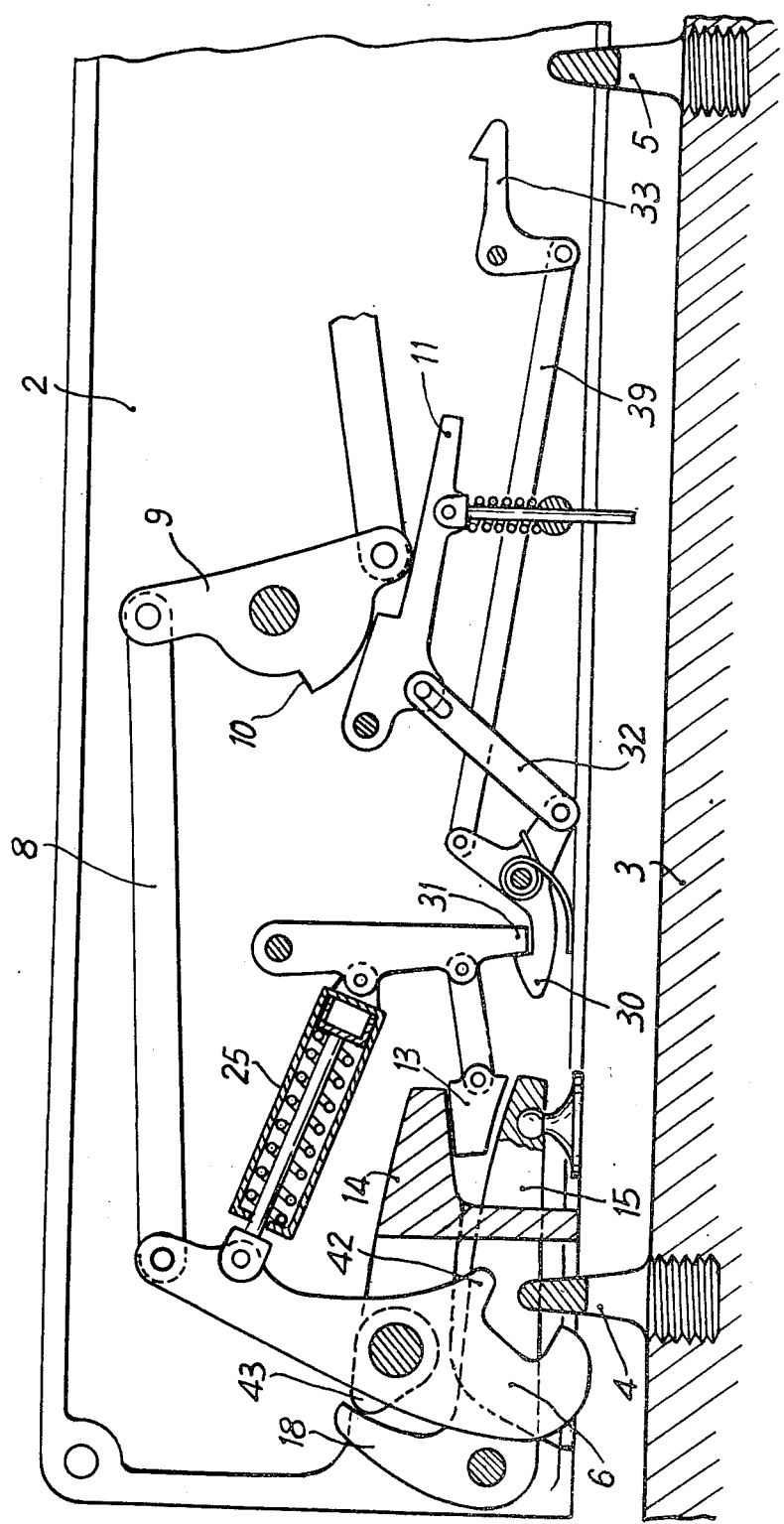

AUTOMATIC HANGING AND WEDGING DEVICE FOR AIRCRAFT LOADS

BACKGROUND OF THE INVENTION

1. Field of the invention

This invention relates in general to aircraft jettisoning means and has specific reference to an improved device for automatically and releasably hanging or suspending and wedging up loads to be carried under aircraft.

2. Description of the Prior art

In a prior U.S. Pat. No. 3,840,201 filed by the same applicants and in prior U.S. patent applications Ser. No. 448,952, Ser. No. 449,014, now U.S. Pat. No. 3,854,680 and Ser. No. 449,015 now U.S. Pat. No. 3,854,681, filed by the same applicants on Mar. 7, 1974 there is disclosed a device based on the principle consisting in interposing, between the suspension hook support carried by the aircraft and the load to be releasably fastened thereto, spring-loaded wedge members or more generally irreversible play take-up members. The action exerted by these wedge members may be delayed to allow a greater latitude in the operation consisting in introducing the support hooks into the corresponding receiving members, such as a ring or bridge pieces, provided on the load. Once the load has been safely hooked or hung, a separate manual control member is actuated for releasing the wedging mechanism proper.

SUMMARY OF THE INVENTION

It is the essential object of the present invention to provide a device so conceived that on the one hand the load hanging step and on the other hand the load holding or wedging step take place with a certain delay after said load hanging step are obtained in a fully automatic manner. Thus, the load can easily be brought to its hanging position and subsequently wedged or held against lateral oscillation in this position without resorting to any additional control manoeuver.

Both this automatic hooking or hanging step and the likewise automatic wedging or load holding step are definitely necessary whenever the detent and wedging or holding controls are not accessible, as observed in certain prior art constructions. In any case, this automatic operation is attended by the dual advantage of gaining time and simplifying the operations.

According to this invention, each suspension hook has mechanically connected thereto an automatic detent device adapted to be urged to its load retaining condition by the direct action exerted by said load on its suspension hook, whereby an automatic delayed-acting locking device of the wedging of holding type is released.

When such wedging or holding devices are operated in detrimental atmospheres, for example in salt sea-air, sand-loaded wind and the like, it is of primary importance to protect the most delicate components of these devices, and to this end the present invention provides a particular arrangement of these component elements, notably by enclosing them in a tight, closed casing structure. It is the essential feature of the arrangement according to this invention to enclose the wedge members as well as the mechanism controlling the suspension hook and the wedge members in a casing, the only elements emerging from this casing being the hook beaks and the wedging or holding members actuated by the inner wedge members and adapted to engage directly the load to be hung and held against lateral oscillation. These wedging or holding members may comprise push members to which an axial movement of translation may be impressed, these push members being slidably mounted in guide bores formed in the wall of said casing. Preferably, fluidtight means may close or seal completely the passages provided for the hook beaks and the above-mentioned push members through the casing walls.

IN THE DRAWINGS

FIG. 2 illustrates the same assembly seen in vertical cross-section;

FIG. 3 illustrates the device in the open-hook position;

FIG. 4 illustrates a modified embodiment wherein so-called bridge members are substituted for the rings of the preceding form of embodiment;

Figure 1:
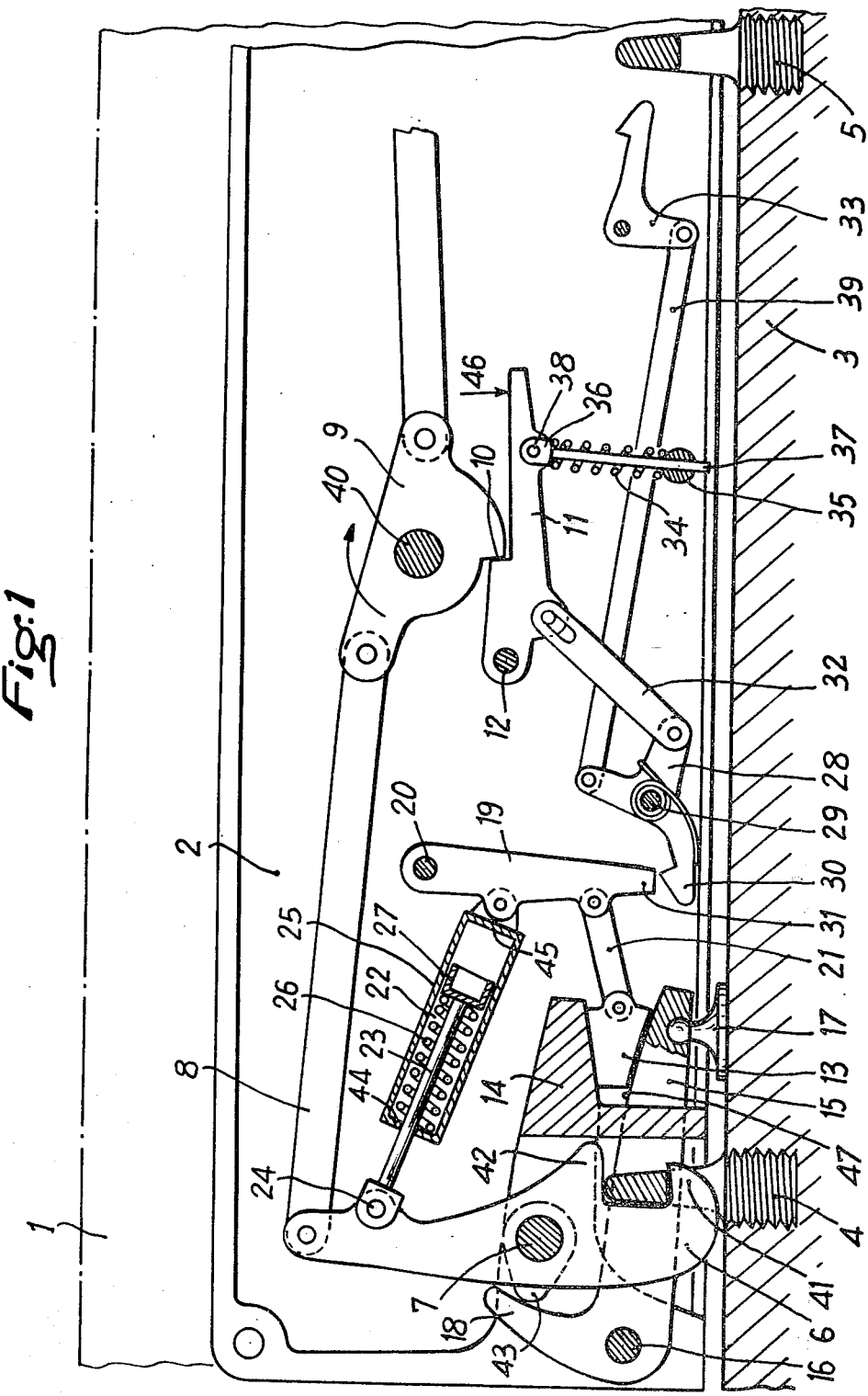
FIG. 1 illustrates the hanging of a load by means of a suspension hook engaging a ring rigid with said load.

Referring first to FIG. 1, the reference numeral 1 designates in general the aircraft structure; 2 is the vertical support interposed between the aircraft structure and the load, 3 is the upper generatrix of the load, and 4 and 5 designate cross rings secured to the load along this generatrix. The right-hand portion of the Figure (not shown) is symmetrical to the left-hand portion. There is also shown at 6 the hook member pivoted to the support 2 by means of a cross-shaft or pivot pin 7; finally, 8 designates a link interconnecting the hook 6 and the retaining member 9 fulcrumed at 40 to the support 2 and provided with a detent heel 10 engaging the release arm 11 pivoted at 12 to said support 2, in the load-retaining and hanging position illustrated.

On either side of hook member 6 a wedge member 13 engages a correspondingly shaped gap formed between a fixed member 14 rigid with said support 2 and a holding lever 15 pivoted at 16 to said support 2. This holding lever 15 comprises on the one hand a swivel shoe 17 bearing against the load 3 and on the other hand an arm 18 adapted to be actuated for raising said lever 15 after the load 3 has been released or jettisoned. The face 47 of holding lever 15 which engages the wedge member 13 has preferably a logarithmic spiral contour in order to provide a constant contact angle irrespective of the degree of depression of said lever 15 and the corresponding engagement of wedge member 13 as a function of the diameter of said load 3. The face of wedge member 13 which engages said lever face 47 has preferably a conjugate contour. A rocker 19 pivoted at 20 to said support 2 is connected to each wedge member 13 by means of a link 21 and to the hook 6 by means of a spring-loaded mechanism 22. This spring-loaded mechanism comprises a piston rod 23 pivoted at 24 to said hook 6 and slidably engaged in a cylinder 25 pivoted in turn to said rocker 19. A helical compression spring 26 is compressed or pre-stressed between the piston 27 of said rod 23 and the bottom 44 of cylinder 25, at the cylinder end opposite said rocker 19.

A first bell-crank lever 28 pivoted at 29 to support 2 comprises a pawl arm 30 adapted to release the beak 31 of rocker 19. This bell-crank lever 28 is operatively connected on the one hand via a lost-motion link 32 to the release arm 11 and on the other hand via a link 39 to another pivoted bell-crank lever 33 associated with the component elements of the right-hand portion (not shown) of the device. A coil compression spring 34 provided for holding the release arm 11 reacts between an abutment member 35 pivoted to said support 2 and a strap or head 36 rigid with a spring guide rod 37 pivoted at 38 to said release arm 11. The reference numeral 41 designates the beak of hook 6 which is adapted to engage the load-carried ring 4, and 42 designates the beak guard of hook 6 which is engaged by the top of said ring 4; finally, 43 designates a cam portion of said hook member 6 which is adapted in the open-hook position to engage the arm 18 of lever 15 for raising this lever 15 after the load has been jettisoned or released.

Under these conditions, it is clear that this device operates automatically by simply causing the rings 4 of load 3 to engage and pivot the hooks 6 of support 2 in the counter-clockwise direction. During their pivoting movements these hooks 6 cause the components of the device to change from the relative positions shown in FIG. 3 to those shown in FIG. 1, the wedge members 13 being released only after the hooks have been properly closed, when the ultimate detent of the retaining means 9 has permitted the pivoting movement of release arm 11 and consequently the actuation of the first bell-crank lever 28 for eventually releasing the rocker 19.

OPERATION

In operation, the load 3 is lifted by using conventional means (such as winches or fork lift trucks) until the rings 4 and 5 are engaged on the relevant hooks 6 of support 2. The upper portion of each ring 4, 5 by acting against the beak guard 42 of hook 6 in the open position thereof (see FIG. 3) causes this hook 6 to pivot about its pivot pin 7, thus pulling the link 8 and rotating the retaining means 9 about the pivot pin 40, while the traction exerted on piston-rod 23 and piston 27 compresses the coil spring 26 in cylinder 25. As the spring 26 reacts against the bottom 44 of cylinder 25, it tends to rotate the rocker 19 about its pivot pin 20 in the direction to cause the wedge 13 to be driven into the gap formed between the fixed member 14 and wedging lever 15. However, this rotational movement is delayed until, as a consequence of the closing of hook 6, the corresponding rotation of retaining means 9 has brought the detent heel 10 in proper registration with a corresponding shoulder formed on release arm 11. The engagement of this release arm 11 due to the rotation thereof about pivot pin 12, under the force of spring 34, is attended, through the medium of lost-motion link 32, by the counter-clockwise rotation of the first bell-crank lever 28 fulcrumed on pin 29, thus releasing the rocker 19. Under these conditions, the wedge members 13 become operative to take up any play likely to develop between shoes 17 and load 3.

Since the system is a twin one acting on either side of the ring 4, the load cannot oscillate in a transverse plane (in relation to support 2), as will be readily understood from FIG. 2.

When it is desired to jettison the load by exerting a downward force on release arm 11 at point 46, according to the conventional procedure, the hook 6 is opened and exerts via piston-rod 23 a pressure against the bottom 45 of cylinder 25 which is adjacent the rocker 19, while retracting the wedge members 13. The cam face 43 formed on hook 6 engages the arms 18 of the load holding levers 15 to restore them to their uppermost position. The force of spring 26 is exerted in the hook opening direction, so that it constantly urges the holding lever 15 to its uppermost position.

In certain cases, it may be advantageous to cause both holding levers 15 to rotate about their pivot pins 16 and cause the load 3 to assume a well-defined and proper position under rolling conditions.

It will readily occur to those skilled in the art that the relative arrangement of parts described hereinabove with reference to FIG. 1 to 3 could be modified without changing the specific functions of these parts, and that more particularly the cam means for raising the holding lever 15 could be replaced by any suitable linkage of spring means associated with or responsive to, the hook opening movement.

FIG. 4 illustrates likewise at 1 the aircraft structure, at 2 the vertical support interposed between the aircraft structure and the load, at 3 the load (or at least its upper generatrix), but in this modified arrangement the rings 4, 5 are replaced by bridge member 48 secured to the load according to a disposal already disclosed in the above-mentioned U.S. patent applications Ser. No. 449,014, now U.S. Pat. No. 3,854,680 and Ser. No. 449,015, now U.S. Pat. No. 3,854,681. The basic components of the device are the same as those of the device shown in FIGS. 1 to 3 attached hereto and are designated by the same reference numerals.

Each wedge member 13 is adapted to engage the gap formed between the fixed portion 14 and the upper face of member 48. The beak guard 42 of hook 6 comprises a roller 49 engaging the member 48 when the load 3 is brought to its final hanging position. The levers 15 and the components associated therewith are dispensed with. Otherwise, the operation is the same as in the preceding example.

Figure 5:
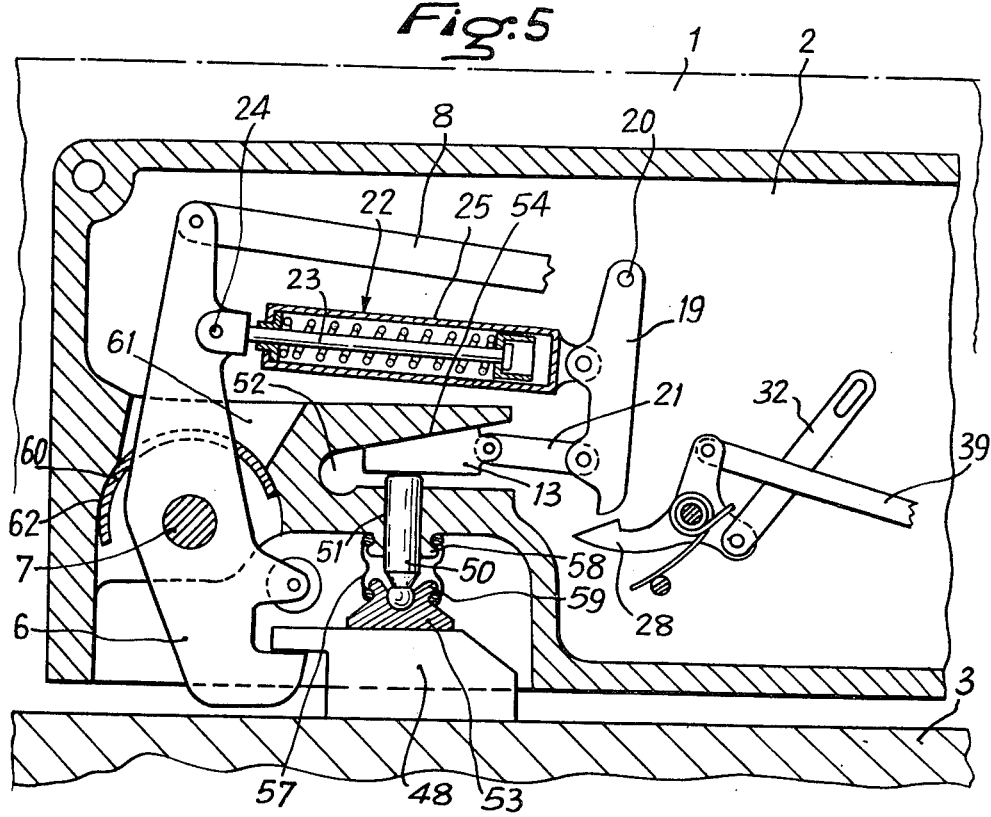
FIG. 5 illustrates in fragmentary longitudinal section a device of which the general arrangement, similar to that shown in FIG. 4, is completed by means aiming at sealing the mechanism against the ingress of foreign bodies.
Figure 6:
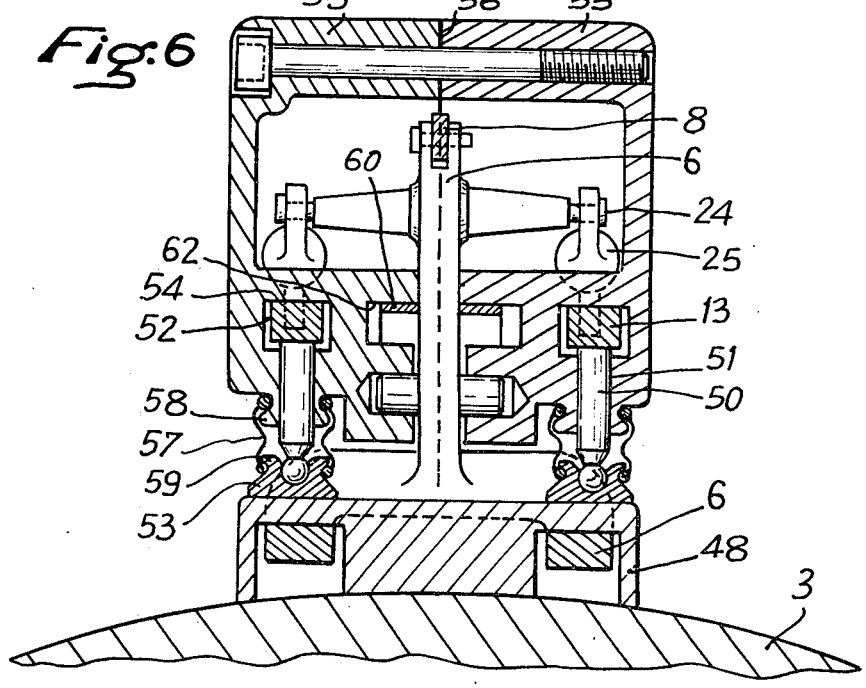
FIG. 6 is a cross-sectional view of the device shown in FIG. 5.

While the wedge member 13 of the device of FIG. 4 engages directly the bridge member 48, each one of wedge members 13 of the device of FIGS. 5 and 6 acts through the medium of a push member 50 slidably fitted in a guide bore 51 formed in said support 2. With this arrangement, each wedge member 13 can be engaged into a recess 52 also formed in said support 2. As illustrated in FIG. 6, the wedging device further comprises wedge members 13 also disposed by pairs, the two wedge members of each pair being disposed on either side of the front suspension hook for one of the pairs of wedge members and on either side of the rear suspension hook for the other pair.

Each push member 50 engages the relevant bridge member 48 through the intermediary of a ball-and-socket device 53 under the thrust of a wedge member 13 reacting against the upper corresponding wall 54 of each recess 52.

FIG. 6 further illustrates how the support 2 consists of a pair of shells or casing halves 55 assembled along their common joint plane 56.

It is clear that the main and delicate component elements of the device are enclosed in a substantially parallelepiped casing from which only the ends of push members 50 and the beaks of hooks 6 project. Although the passages formed to this end in the casing walls are dimensioned with a degree of precision sufficient to minimize gaps, the tightness of the assembly is advantageously improved by providing around each push member 50 a resilient sleeve 57 adapted to protect the external or projecting portion of the push member while permitting the relatively moderate beats of the relevant ball-and-socket device 53. This sleeve 57 is resiliently retained on the one hand, at one end, on a circular bead 58 formed on the main support 2 and on the other hand, at the opposite end, on a similar bead 59 formed on the ball-and-socket device 53.

Likewise, at the pivotal mounting 7 of hook 6, a shield 60 of part-cylindrical configuration centered to the axis of pin 7 of hook 6 and rigid with the upper arm of said hook 6, seals an elongated aperture 61 formed in said support 2 to permit the angular movements of said hook 6. This elongated aperture 61 opens into a cylindrical surface 62 of same radius as said shield 60, and the two edges of the shield constantly engage the cylindrical surface 62 of said support, irrespective of the open or closed position of the hook.

Casing 55 and sealing means 57-60 can be used with a hook mechanism without the automatic load holding and releasing means.

What we claim is:

1. Device for automatically and releasably hanging and holding loads carried under aircraft against lateral oscillation, comprising automatic detent means of the wedge member type for retaining the load, means for mechanically connecting said detent means to a pivoting suspension hook when said suspension hook is engaged by the load, and automatic load holding means adapted to hold the load against lateral oscillation, said automatic load holding means being actuated directly by said hook.

2. Device as set forth in claim 1, wherein said load holding means comprise a spring-type actuator interposed between on the one hand a lever controlling the actuation of said wedge members and on the other hand a load suspension hook, said actuator acting on the one hand in the direction to urge said wedge members to the hook closing position and on the other hand in the direction to open said hook in the release position of said detent means.

3. Device as set forth in claim 2, wherein each wedge member is adapted to react against a fixed element of the aircraft structure and a movable holding member adapted to engage the load in order to hold same against lateral oscillation.

4. Device as set forth in claim 3, wherein each wedge member is adapted to engage a shoe-supporting load-holding member consisting of a pivoting lever carrying a shoe adapted to engage the top of the load for holding same against lateral oscillation.

5. Device as set forth in claim 4, wherein the contour of the operative faces of each wedge member and the faces between which said wedge member is operative, notably the face of the movable member which is associated with the holding shoe, is such that it provides a constant contact angle.

6. Device as set forth in claim 5, wherein two shoe-supporting load-holding levers are provided, one on each side of each load suspension hook.

7. Device as set forth in claim 4, wherein said pair of pivoting levers disposed on either side of a suspension hook are operatively interconnected.

8. Device as set forth in claim 5, wherein said pair of pivoting levers disposed on either side of a suspension hook are responsive to the action of a mechanism operatively connected to said hook so as to raise said levers during the hook opening movement.

9. Device for releasably hanging and holding loads carried under aircrafts against lateral oscillation, comprising load holding members adapted to engage directly the load to be held against lateral oscillation, wedge members adapted to engage directly the load holding members, pivotally mounted suspension hooks having beak portions for engaging the load, a closed casing having apertures, and a mechanism capable of controlling both said load suspension hooks and said wedge members, said mechanism and said wedge members being mounted in said closed casing with only the beak portions of said load suspension hooks and said load holding members responsive to said wedge members projecting from said casing apertures, each of said load holding members comprising a push member extending through one aperture of said casing and a ball and socket means capable when said push member is actuated by said wedge members to engage the top of the load to be held against lateral oscillation.

10. Device as set forth in claim 9, wherein each wedge member is disposed in a recess formed in said closed casing and adapted, in its operative position, to engage the top surface of said recess and thus push a corresponding load holding member downwards.

11. Device as set forth in claim 10, wherein said aperture formed in said casing to permit the projection of said hook beak portions and load holding members are sealed, the former by means of shields having a part-cylindrical configuration, and the latter by means of resilient sleeves.

* * * * *